United States Patent [19]
Larat et al.

[11] Patent Number: 5,838,710
[45] Date of Patent: Nov. 17, 1998

[54] OPTICAL AMPLIFICATION DEVICE

[75] Inventors: Christian Larat, Paris; Gilles Feugnet, Les Ulis; Muriel Schwarz, Chatillon, all of France

[73] Assignee: Thomson-CSF, Paris, France

[21] Appl. No.: 713,209

[22] Filed: Sep. 12, 1996

[30] Foreign Application Priority Data

Oct. 6, 1995 [FR] France .................................. 95 11793

[51] Int. Cl.$^6$ ....................................................... H01S 3/09
[52] U.S. Cl. ............................... 372/69; 372/70; 372/98; 372/93; 372/72
[58] Field of Search ............................... 372/92, 69, 70, 372/72, 93, 98

[56] References Cited

U.S. PATENT DOCUMENTS 3,852,684  12/1974  Roess et al. ................................ 372/92
5,315,612   5/1994  Alcock et al. .............................. 372/93

OTHER PUBLICATIONS

Patrick Georges, et al., "High–Efficiency Multipass Ti:Sapphire Amplifiers For A Continuous–Wave Single–Mode Laser", 2412 Optics Letters, vol. 16, Feb. 1, 1991, No. 3, New York, NY, US, pp. 144–146.

Todd E. Olson, et al., "Multipass Diode–Pumped Nd:YAG Optical Amplifiers at 1.06 um and 1.32 um", 8342 IEEE Photonics Technology Letters, vol. 6, May 1994, No. 5, New York, US, pp. 605–608.

Henry Plaessmann, et al., "Multipass Diode–Pumped Solid–State Optical Amplifier", 2412 Optics Letters, vol. 18, No. 17, Sep. 1, 1993, Washington, US, pp. 1420–1422.

*Primary Examiner*—Leon Scott, Jr.
*Attorney, Agent, or Firm*—Oblon, Spivak, McClelland, Maier & Neustadt, P.C.

[57] ABSTRACT

Disclosed is an optical amplification device comprising an amplifier medium inserted between two mirrors and an optical pumping source. The mirrors are confocal mirrors whose focal plane is located in the vicinity of the center of the non-linear medium. This medium has a match-stick shape with a large axis in one direction forming an angle alpha/2 with the optical axis of the cavity defined by the two mirrors and the amplifier medium. This architecture enables an incident optical wave to pass several times within the amplification device leading to an increase in the performance characteristics of said device.

9 Claims, 3 Drawing Sheets

OPTICAL AMPLIFICATION DEVICE

BACKGROUND OF THE INVENTION

1. Field of the Invention

The field of the invention is that of optical amplifiers that bring into play the laser effect and can be used to obtain high-power lasers out of low-power or medium-power oscillators.

2. Description of the Prior Art

Generally, laser amplification is achieved by stimulated emission corresponding to the release of photons, by a drop to a lower level of energy. In the case of this stimulated emission, the inducing and induced rays have the same phase, the same direction and the same polarization creating a true amplification of light. However, the radiation that reaches a given medium has an exceedingly greater probability of being absorbed than of prompting a stimulated emission. To generate the stimulated emission, it is necessary to introduce an inversion of population between the fundamental state and the excited state within the active medium. This population inversion is prompted by an external excitation which is usually called pumping. This is why, a laser amplifier is conventionally formed by an active medium that can generate a stimulated emission by a pumping source. The active medium may be a solid medium (glass, crystal such as YAG, sapphire, etc.) containing an active element (transition element, rare earth such as neodymium, chromium, titanium, etc.). The source of optical pumping has an emission wavelength adapted to the absorption bands of the active element. For example, the $Nd^{3+}$ ion in the YAG crystal shows absorption at a wavelength of 808 nm, compatible with the emission of GaAs/GaAlAs type laser diodes.

According to this principle of amplification, an incident laser beam with a wavelength of $\lambda_s$ is introduced into the amplifier medium which is capable, when it is optically pumped at a wavelength $\lambda_p$, of emitting photons at the wavelength $\lambda_s$. To obtain efficient amplification, it is important to have the right overlapping between the region of the amplifier medium in which the incident beam passes and the zone of the amplifier medium that is optically pumped.

SUMMARY OF THE INVENTION

To increase the performance characteristics of an optical amplification device as described here above, the invention proposes a particular architecture of an amplification device enabling the incident beam that has to be amplified to pass several times through the amplifier medium.

More specifically, an object of the invention is an optical amplification device comprising a solid amplifier medium with a parallelepiped type geometry having a large axis in one direction and a source for the optical pumping of the amplifier medium, wherein:

the amplifier medium is inserted between two concave and confocal mirrors, the focal plane of which is located in the vicinity of the center of the medium, the direction of said medium forming an angle $\alpha/2$ with the normal to the focal plane of the mirrors;

said device comprises means for the entry of optical beams to be amplified and means for the exit of amplified optical beams.

Preferably, the optical pumping can be done transversally with respect to the axis of the optical cavity by the set consisting of the two mirrors and the amplifier medium.

The optical pumping may also be done longitudinally with respect to the axis of the cavity defined here above.

The pumping source may advantageously include one or more laser diodes that can be offset from the amplifier medium by means of optical fibers so as to limit the problems of heat dissipation within the amplifier medium.

An object of the invention also is an optical amplification device in which the mirrors $M_1$ and $M_2$ are integrated into the amplifier medium.

Advantageously, the faces of the amplifier medium perpendicular to the optical axis of the device may include a curved part provided firstly with a mirror Ml or $M_2$, and secondly, with a part transparent to the optical beam to be amplified.

BRIEF DESCRIPTION OF THE DRAWINGS

The invention will be understood more clearly and other advantages shall appear from the following description, given by way of a non-restrictive example, with reference to the appended figures, of which.

MORE DETAILED DESCRIPTION

In general terms, the amplification device according to the invention comprises a crystal or glass type solid amplifier medium doped with an active element that may be of the neodymium, chromium, titanium or other type pumped by a source capable of introducing the necessary inversion of population between the fundamental state and the excited state to generate the desired amplification. The geometry of the amplifier medium may advantageously be of a wafer type.

FIG. 1 gives a schematic view of an exemplary device according to the invention in which the amplifier medium has a match-stick type of parallelepiped shape. In this example, the medium m is pumped transversely by a pumping source P. This pumping source may be a set of laser diodes enabling high pumping power to be obtained. To cope with the problems of thermal dissipation, it may be advantageous to use a network Rf of optical fibers firstly connected to laser diodes and secondly coupled to the solid active medium as shown in FIG. 2.

Figure 1A:
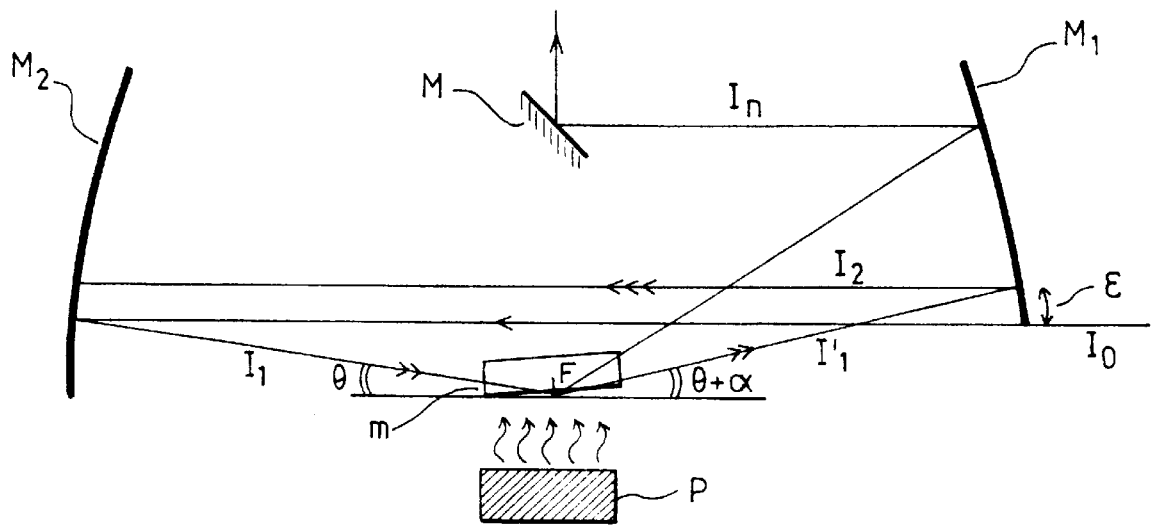
FIG. 1a gives a schematic view of an exemplary amplification device according to the invention.
Figure 1B:
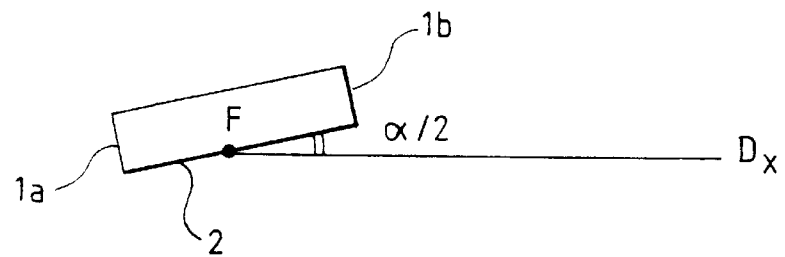
Figure 2:
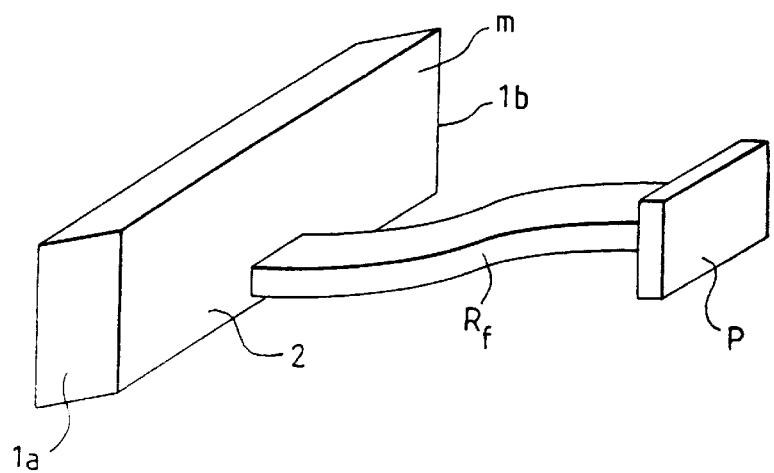
FIG. 2b shows an enlarged view of the amplifier medium m in the amplification device shown in FIG. 1a, FIG. 2 illustrates an example of transversal pumping using a pumping source and networks of fibers.

As shown in FIG. 1a, the amplifier medium is placed between two mirrors $M_1$ and $M_2$. Its large axis is tilted by an angle $\alpha/2$ with respect to the axis of the cavity $D_x$ so as to generate the multiple passage of an incident wave within two mirrors. FIG. 1b shows an enlarged view of the amplifier medium m used in the device shown schematically in FIG. 1a . The lateral faces of the medium m (faces 1a and 1b) as well as the face 2 coupled to the pumping source must be of very high optical quality. The incident beam to be amplified, which is of the laser beam type, enters by the face 1a and comes out by the face 1b after being reflected on the face 2 by total reflection. The faces 1a and 1b may be provided with anti-reflection treatment (to minimize the insertion losses). It may also be the case that these faces are not plane in order to compensate for possible optical aberrations induced on the laser beam by a thermal effect due to the optical pumping operations.

In the above-mentioned amplifier media used in the invention, there are high pump absorption coefficients (>5 cm$^{31}$ $^1$) in the vicinity of the face 2. These are therefore pump absorption coefficients with localization of the gain in terms of amplification that are above all high in the vicinity of this face, namely the zone in which the laser beam to be amplified is preferably introduced.

By using the total reflection of the face 2 of an incident beam whose incidence with respect to the normal to the face 2 is sufficiently great (i.e. with θ having a low value), it is possible to obtain the right overlapping between the incident beam and the optical pumping zone.

In the example of a device shown in FIG. 1, a confocal cavity is made with two parabolic mirrors $M_1$ and $M_2$, the focal point of which is placed at the center of the medium m. The inlet medium has an aperture or a dissymmetry so as to enable the entry of the incident beam that is to be amplified into the cavity thus defined.

In this example, the incident beam $I_o$ enters in parallel to the optical axis of the cavity and is then focused by the mirror $M_1$ as a beam $I_1$ at the focal point F, with an angle of incidence θ.

When the face 2 is parallel to the optical axis, this incident beam comes out from the cavity at the position where it has entered and there has been no multiple passage of beams within the cavity.

This is why, in the device of the invention, the large axis of the amplifier medium forms an angle α/2 that is not zero with the optical axis of the cavity. After reflection on the mirror $M_1$, the incident beam $I_1$ is sent back to the focal point F of the mirrors and then reflected as the beam $I'_1$ within the amplifier medium in a direction that forms an angle θ+α on the mirror $M_2$. This beam I'1, since it has come from the focal point F, may again be reflected by the mirror $M_2$ parallel to the axis of the cavity. The beam I'1 is reflected at the mirror $M_1$ as a beam $I_2$, parallel to the incident beam $I_o$ but spaced out by a distance ε with respect to this incident beam $I_o$.

The cycle may be repeated several times. At each passage, the beam is amplified in the amplifier medium. At the end of the operation the beam In amplified n times may be extracted from the cavity by an appropriate aperture at one of the mirrors or may be extracted by the presence of a mirror M placed in the cavity as shown in FIG. 1 (to make FIG. 1 easier to understand, only the first amplified beams and the last amplified beam In have been shown in this figure).

It must be noted that the spacing ε between the beams remains substantially constant between different passages for angles of incidence θ that are not excessively high (below about 35°).

Figure 3A:
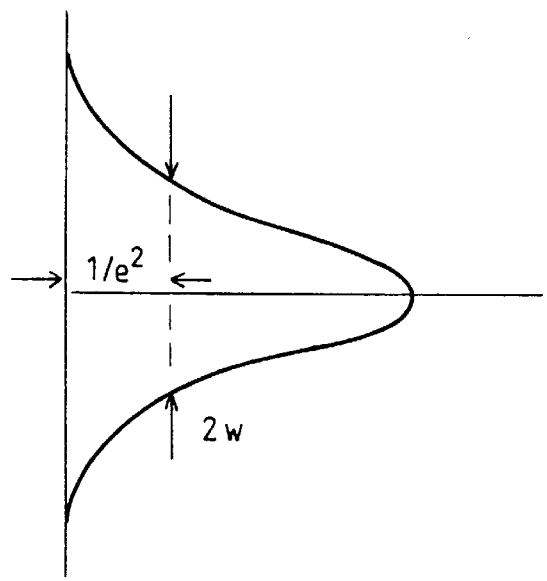
FIG. 3a shows the Gaussian shape of the intensity of an incident laser beam.
Figure 3B:
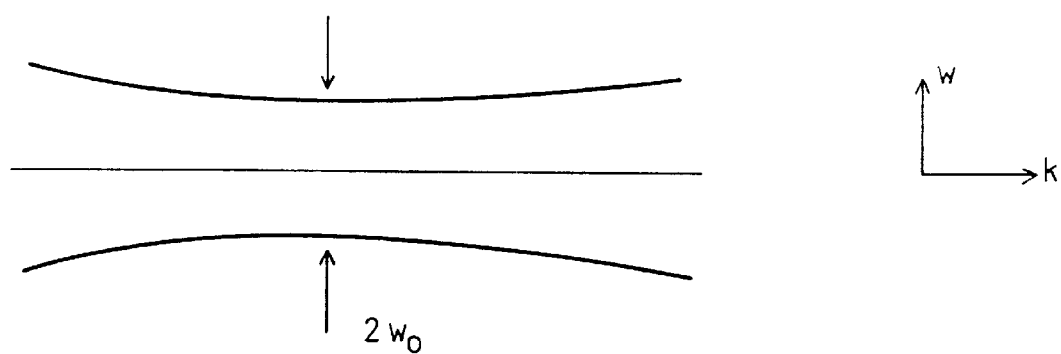
FIG. 3b illustrates the "waist" of a Gaussian optical beam.

Indeed, the incident beam to be amplified is Gaussian-shaped and its diameter 2 w at a 1/e$^2$ is defined conventionally as illustrated by FIG. 3a. This dimension 2 w is not constant along the direction of propagation K and passes through a minimum value 2 $w_o$ also called a "waist" as shown in FIG. 3b. By placing the "waist" of the incident beam in the focal beam of the mirrors $M_1$ and $M_2$ (namely the plane perpendicular to the optical axis of the device passing through F), it is known that the "waist" after reflection on one of the mirrors $M_1$ or $M_2$ is also located in this focal plane. The relationship between these two "waists" is given by the following equation:

$$wo_1 wo_2 = \lambda f / PI$$

$wo_1$ being the waist before reflection in a mirror $wo_2$ being the waist after reflection in a mirror λ being the wavelength of the incident beam to be amplified f being the focal distance of the mirrors.

After reflection inn the second mirror, the "waist" $wo_3$ is substantially equal to the "waist" $wo_1$. Thus, the size of the beam in the amplifier medium is kept from one passage to another.

Exemplary embodiment of an amplification device using two parabolic mirrors $M_1$ and $M_2$ and a transversal pumping within a parallelepiped-shaped amplifier medium A 20 cm cavity is formed by two parabolic mirrors $M_1$ and $M_2$. The radius of curvature of this cavity on the optical axis is also 20 cm. The focal distance of the confocal mirrors is 10 cm. The amplifier medium is pumped by a linear array of laser diodes corresponding to a pumping length close to 1 cm. An incident laser beam with a wavelength 1 μm having a "waist" of about 330 μm is introduced into the cavity. After reflection on one of the mirrors, the "waist" of the beam at the amplifier medium is close to 100 μm, its incidence θ being of the order of about 10°. The amplifier medium is oriented in the cavity so that its large axis forms an angle of about 0.5° with the optical axis of the cavity.

Through this orientation, it is possible to obtain about ten passages with mirrors having a lateral extension of less than 25 mm, the different successively amplified beams being separated by a distance ε close to 2 mm, corresponding at least to two Gaussian beam widths taken at the base and not at a height of 1/e$^2$, in order to have the minimum losses.

A mirror M is placed in the cavity to extract the beam thus amplified.

In the above example, the incident beam is introduced in parallel to the optical axis of the cavity and has an incidence θ in the amplifier medium after reflection on one of the mirrors. According to other variants of the invention, it is possible to focus the incident beam to be amplified directly on the focal point F at an incidence θ.

It is also possible to send back the outgoing beam on itself with, for example, a phase conjugation mirror to double the number of passages.

Similarly, a transparent element with zero optical power may be introduced between the mirrors $M_1$ and $M_2$ to compensate for the difference in optical wavelength introduced by the amplifier medium which has a difference of optical index with the medium in which it is placed.

The amplification device according to the invention may also be made with spherical mirrors that are simpler to make than parabolic mirrors.

A slight astigmatism appears at the level of the focal point F (all the light beams do not strictly converge at the same point). This astigmatism may be corrected by giving a curved shape to the faces 1a and 1b of the amplifier medium m.

In one variant of the invention, the amplification device may have a highly compact structure in which a pump source and an amplifier medium into which mirrors are integrated enables the invention to be implemented.

Figure 4:
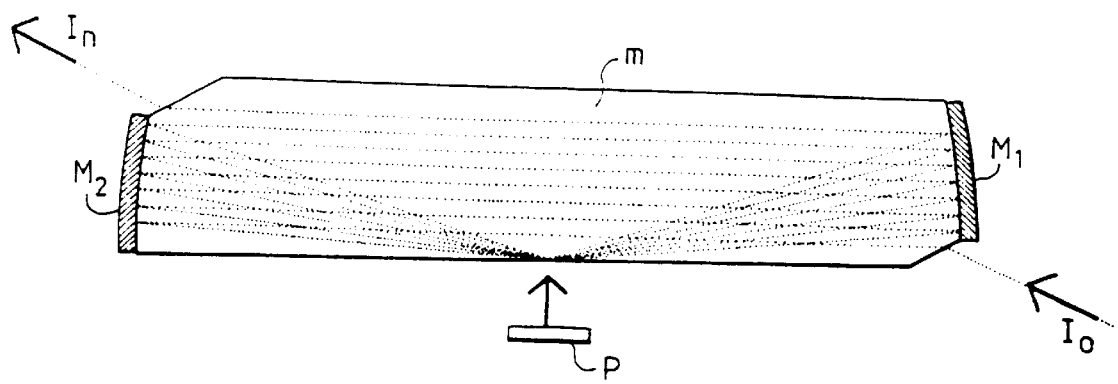
FIG. 4 illustrates an exemplary amplification device according to the invention in which the mirrors $M_1$ and $M_2$ are integrated into the amplifier medium m.

An exemplary architecture of this variant is illustrated in FIG. 4. Typically, the amplifier medium may have a length of some centimeters. The entry and exit of the laser beam may be done as follows:

In this variant of the invention, the faces 1a and 1b have a part that is polished so as to present a parabolic or spherical surface on which the mirrors $M_1$ or $M_2$ are made by the deposition of dielectric multilayers, another part being polished so as to be at the Brewster's incidence to ensure the full transmission of the incident beam in the amplifier medium, in the case of a polarized incident beam.

In another variant, it is possible to envisage the polishing of the faces 1a and 1d so that they have a parabolic or spherical surface on which, at localized places, there are made the mirrors $M_1$ or $M_2$ as well as the anti-reflection layers enabling the entry and exit of the laser beam.

What is claimed is:

1. An optical amplifier comprising:

a cavity having, an optical axis, and a solid amplifier medium having a parallelepiped geometry with a length along a first axis being greater than a length along a second axis that is perpendicular to said first axis;

an optical pump source coupled to said solid amplifier medium so as to pump said solid amplifier medium and generate an optical pumping zone;

a first concave and confocal mirror positioned at a first side of said cavity; and a second concave and confocal mirror positioned at an opposite side of said cavity such that said solid amplifier medium is disposed between said mirrors, said first concave and confocal mirror and said second concave and confocal mirror being positioned to have a common focal point in said cavity; and means for exiting an optical beam from said cavity after said optical beam is amplified, wherein said mirrors and said solid amplifier medium being oriented such that the optical beam that enters said cavity reflects off of said first mirror and through said solid amplifier medium in a first pass through said solid amplifier medium so as to overlap with said optical pumping zone, said optical beam being reflected off of said focal point and directed to said second mirror, in a second pass said optical beam being directed by said mirrors through said solid amplifier medium and so as to overlap with said optical pumping zone a second time and reflect off of said focal point for a second time so that said optical beam, and a waist of said optical beam being maintained in said first and said second pass.

2. The optical amplifier of claim 1, wherein:

said first axis of said solid amplifier medium being positioned at a predetermined angle $\alpha/2$ with respect to the optical axis of said cavity;

in said first pass said optical beam being incident with said focal point at a predetermined angle $\theta$ and departs from said focal point at another predetermined angle $\theta+\alpha$.

3. The optical amplifier of claim 1, wherein said optical pump source being coupled to said solid amplifier medium from a direction generally perpendicular to the first axis of said solid amplifier medium.

4. The optical amplifier of claim 3, wherein the first mirror and the second mirror are integrated into the solid amplifier medium.

5. The optical amplifier of claim 4, wherein said solid amplifier medium comprises a first face directed toward said first mirror, and a second face directed towards said second mirror at least one of said first face and said second face comprise a mirror portion and a transparent portion that is transparent to the optical beam and is cut to a Brewster incidence angle.

6. The optical amplifier of claim 4, wherein said solid amplifier medium comprises a first face facing said first mirror, and a second face facing said second mirror wherein said first face and said second face comprise at least one of a parabolic face and a spherical face that is at least partially covered with a mirror and at least partially covered with an anti-reflection layer being transparent to the optical beam.

7. The optical amplifier of claim 1, wherein said optical pump source comprises at least one laser diode.

8. The optical amplifier of claim 1, wherein said first mirror and said second mirror respectively comprises parabolic mirrors.

9. The optical amplifier of claim 1, wherein the first mirror and the second mirror respectively comprise spherical mirrors, and the means for exiting comprises an astigmatism compensation device.

* * * * *